US005577596A

United States Patent [19]
Van Essen

[11] Patent Number: 5,577,596
[45] Date of Patent: Nov. 26, 1996

[54] SORTING DEVICE WITH A FIELD OF TRANSPORT UNITS

[75] Inventor: Roelof M. Van Essen, Eindhoven, Netherlands

[73] Assignee: U.S. Philips Corporation, New York, N.Y.

[21] Appl. No.: 203,155

[22] Filed: Feb. 28, 1994

[30] Foreign Application Priority Data

Mar. 1, 1993 [EP] European Pat. Off. .............. 93200559

[51] Int. Cl.⁶ .................................................. B65G 47/46
[52] U.S. Cl. ........................................ 198/349; 198/369.5
[58] Field of Search .................................. 198/349, 350, 198/890.1, 369.1, 369.5

[56] References Cited

U.S. PATENT DOCUMENTS

| | | | |
|---|---|---|---|
| 3,754,638 | 8/1973 | Mead | 198/369.1 |
| 4,291,797 | 9/1981 | Ewertowski | 198/349 X |
| 4,603,768 | 8/1986 | Deutschle | 198/369.1 |
| 4,615,446 | 10/1986 | Pavie | 209/583 |
| 4,824,349 | 4/1989 | Oku et al. | 198/349 X |
| 5,078,257 | 1/1992 | Carter, Jr. | 198/369.5 |

FOREIGN PATENT DOCUMENTS

| | | | |
|---|---|---|---|
| 0144908 | 6/1985 | European Pat. Off. . | |
| 9200906 | 1/1992 | European Pat. Off. . | |
| 12960693 | 5/1969 | Germany | 198/369.5 |
| 361211217 | 9/1986 | Japan | 198/369.5 |

OTHER PUBLICATIONS

"Indexing And Sorting Of Letter–Mail" Nov. 1985, Nederlandse Philips Bedrijven B. V. Industrial & Electro–Acoustic Systems, Advanced Automation Systems.

Primary Examiner—D. Glenn Dayoan
Attorney, Agent, or Firm—Leroy Eason

[57] ABSTRACT

A sorting device is provided with a transport device (5) for displacing objects such as, for example, postal items (99) from an input station (1) to an output position (3a, 3b) selected from among a plurality of output positions (3). The transport device (5) includes a field (101) of individual transport units (23, 105) arranged in a hexagonal grid shape and each provided with a transport mechanism (27) arranged on a rotatable support (25). The output positions (3) are positioned alongside the field (101), while the field (101) is accessible through at least two separate input positions (9, 11, 109, 119). Alternative routes can be selected by an electronic control unit (15) and microprocessors (127) in the field (101) between an input position (9, 11, 109, 119) and a selected output position (3) by joining together the individual transport units (23, 105) where the use of at least two separate input positions (9, 11, 109, 119) and of the grid-shaped field (101) renders it possible to move several postal items simultaneously and in parallel through the field (101), so that the sorting device has a great handling capacity and the sorting device is suitable for sorting of postal items which are provided with address codes corresponding to destinations of the items. During sorting of comparatively light postal items such as letters, a great capacity is provided, while a satisfactory capacity is provided during sorting of comparatively heavy postal items which are moved at comparatively low speeds through the sorting device, for example, postal parcels.

13 Claims, 8 Drawing Sheets

SORTING DEVICE WITH A FIELD OF TRANSPORT UNITS

FIELD OF THE INVENTION

The invention relates to a sorting device with an input position, a plurality of output positions, and a transport device for the selective displacement of an object from the input position to one of the output positions.

The invention also relates to a transport unit suitable for use in a sorting device according to the invention.

BACKGROUND OF THE INVENTION

A sorting device of the kind mentioned in the opening paragraph is known from the brochure "Indexing and Sorting of Letter-Mail" issued in November 1985 by Nederlandse Philips Bedrijven B. V., Industrial & Electro-Acoustic Systems, Advanced Automation Systems. The known sorting device, which has the type number PS 1010, is used for automatic sorting of postal items such as letters and comparatively thin postal parcels which carry an address code. The postal items are transported from the input position to an automatic address code reader and are subsequently transported to a selected output position in sequential manner by the transport device, which device comprises an assembly of rollers, conveyor belts and transport ropes, and which forms a single route. The output positions are arranged along a number of side branches of the transport device and are selectively accessible through the use of adjustable switching flaps. The known sorting device is provided with an electronic control unit which controls the switching flaps on the basis of data provided by the address code reader.

A disadvantage of the known sorting device is that the sorting device has a limited transport capacity owing to the sequential transport of the postal items. Comparatively heavy postal items, which are moved through the transport device at a comparatively low speed, can accordingly only be sorted with a comparatively low capacity.

SUMMARY OF THE INVENTION

An object of the invention is to provide a sorting device of the kind mentioned in the opening paragraph which has a higher transport capacity, so that comparatively heavy postal items can also be sorted with a satisfactory capacity.

The invention is for this purpose characterized in that the transport device comprises a field of separate transport units, a separate input position being assigned to at least two transport units, while the transport units each have a transport direction which is adjustable relative to a system of coordinates which is in a fixed position relative to the field, alternative through routes being selectable in the field between an input position and a selected output position through mutual orientation of the transport directions of the individual transport units. The use of a field of separate transport units with adjustable transport directions and more than one input position provides a system of routes running next to one another and crossing one another between the input positions and the output positions, so that several objects can be moved simultaneously. A considerably higher transport capacity is thus achieved during sorting of comparatively light objects at comparatively high transport speeds, while a satisfactory transport capacity is achieved during sorting of comparatively heavy objects with comparatively low transport speeds. When an object has reached a given transport unit in the field, and a next transport unit is temporarily occupied, an adjoining, free transport unit may be selected, i.e. an alternative route, so that a stagnation in the displacement of the relevant object is prevented as much as possible.

A special embodiment of a sorting device according to the invention is characterized in that the separate transport units are arranged in parallel tracks, the object being displaceable in a track through mutual orientation of the transport directions of the transport units of the relevant track, while the object is displaceable from one of two adjoining tracks to the other track through mutual orientation of the transport directions of the transport units of these adjoining tracks. The use of the parallel and combinable tracks renders it possible for an object which is being displaced in a certain track to switch to an adjoining track if a next transport unit in the former track is temporarily occupied. Stagnations can be prevented in this manner over the entire length of the tracks.

A further embodiment of a sorting device according to the invention, in which the transport capacities of the parallel tracks of the transport device are utilized as well as possible, is characterized in that at least two input positions are present at each of the two ends of the parallel tracks.

A yet further embodiment of a sorting device according to the invention, in which a practical and readily accessible arrangement of the output positions is provided, is characterized in that the output positions are arranged along an exterior track.

A special embodiment of a sorting device according to the invention is characterized in that the transport units are each provided with a transport mechanism which is arranged on a support and which determines the transport direction of the transport unit relative to a system of coordinates which is fixed relative to the support, while the supports of the individual transport units extend in a common plane which is parallel to the system of coordinates which is fixed relative to the field, and the supports are each rotatable about an axis of rotation which extends perpendicular to the common plane, the mutual orientation of the transport directions of two adjoining transport units being achieved by a suitable rotation of the relevant supports about their axes of rotation. The use of the rotary supports provides a through route in a fast and simple manner from a transport unit to an adjoining transport unit. In addition, the individual transport units, the input positions and the output positions may be arranged in different manners relative to one another in the design of the sorting device.

A further embodiment of a sorting device according to the invention is characterized in that the supports are disc-shaped and the field of transport units has a hexagonal grid shape, while the support of at least one central transport unit is hexagonally surrounded by the supports of six adjoining transport units. The arrangement of the disc-shaped supports in a hexagonal grid shape renders it possible to position an optimized number of separate transport units within a field available for the sorting device, so that an optimum transport capacity of the sorting device is provided.

A yet further embodiment of a sorting device according to the invention is characterized in that the support of a transport unit has a preferred position in which the transport direction of the transport unit runs parallel to a track of the field, while the support has two subsidiary positions in which the support is rotated through a positive angle of 60° and through a negative angle of 60°, respectively, relative to the preferred position. In the preferred position of the transport unit of the hexagonal grid field, the object is displaceable to a next transport unit in the same track, whereas the object is displaceable to one of the adjoining tracks in the case of a subsidiary position of the transport unit.

A particular embodiment of a sorting device according to the invention, in which the preferred position and the two subsidiary positions of the support are detectable by simple means, is characterized in that the support is provided near a circumference with a first and a second identification mark, which marks are present on two radians of the axis of rotation of the support which enclose an angle of 60° with one another, while a first and a second detector are arranged around the support on two radians of the axis of rotation of the support which enclose a positive and a negative angle of 30°, respectively, with a main radian of the axis of rotation directed parallel to the track, which detectors are in a fixed position relative to the field, the first and the second identification mark being simultaneously detectable by the first and the second detector, respectively, in the preferred position of the support, while exclusively the second identification mark is detectable by the first detector in one of the two subsidiary positions of the support, and exclusively the first identification mark is detectable by the second detector in the other subsidiary position of the support.

A further embodiment of a sorting device according to the invention, in which the sorting device has a large number of output positions, is characterized in that two output positions are assigned to a transport unit arranged in an exterior track of the field, an object being displaceable to the output positions by means of the transport unit in two subsidiary positions of the support in which the support is rotated through an angle of 60° and through an angle of 120°, respectively, relative to the preferred position.

A yet further embodiment of a sorting device according to the invention is characterized in that the transport mechanism is provided with two conveyor belts arranged parallel to the transport direction of the transport unit, each belt being guided around two rollers which are displaceable transverse to the transport direction against a reset force and which have axes of rotation extending perpendicular to the support, whereby the object is displaceable in the transport direction by means of a clamping action between the two conveyor belts caused by the reset force. The use of the said transport mechanism renders objects of different dimensions displaceable, while the transport mechanism is self-adjusting owing to a displacement of the rollers subject to the dimension of the object in a direction transverse to the transport direction.

A special embodiment of a sorting device according to the invention, in which the reset force of the rollers necessary for clamping-in the object is achieved in a simple manner, is characterized in that the conveyor belts are elastic, the reset force arising through elastic deformation of the conveyor belts upon a displacement of the rollers.

A further embodiment of a sorting device according to the invention is characterized in that the conveyor belts are each guided around two outer rollers which are arranged in a fixed position relative to the support and which have a comparatively small diameter and an axis of rotation directed perpendicular to the support, while the displaceable rollers have a comparatively great diameter and are arranged between the outer rollers, the displaceable rollers being pivotable about a pivot axis directed parallel to the axis of rotation of the outer rollers. The required elastic deformation of the conveyor belts is achieved in a simple and practical manner by the said rollers, while both flat objects of a comparatively small thickness and flat objects of a comparatively great thickness are displaceable by means of the conveyor belts.

A yet further embodiment of a sorting device according to the invention is characterized in that the transport units each comprise a sensor for measuring a dimension of the object to be displaced parallel to the transport direction. The moment at which the transport unit will be entirely clear again after the transport of the object to an adjoining transport unit can be derived from the measured dimension of the object and from the transport speed of the transport unit, so that any required rotation of the relevant adjoining transport unit can take place then. The capacity of the sorting device is further improved in this manner.

A particular embodiment of a sorting device according to the invention is characterized in that the transport units each have a separate microprocessor which is connected to the microprocessors of the adjoining transport units which cooperate with the relevant transport unit, the object being displaceable by the transport unit to an adjoining transport unit to be determined by the microprocessor in accordance with a shared search algorithm, while the microprocessor upon a displacement of the object to the adjoining transport unit passes on a desired output position for the object to the microprocessor of the adjoining transport unit. Since each transport unit is provided with an individual microprocessor, a route to be followed by the object can be selected quickly, simply, and independently of other objects.

BRIEF DESCRIPTION OF THE DRAWINGS

The invention is explained in more detail below with reference to a drawing, in which.

DETAILED DESCRIPTION OF THE PREFERRED EMBODIMENTS

Figure 1:
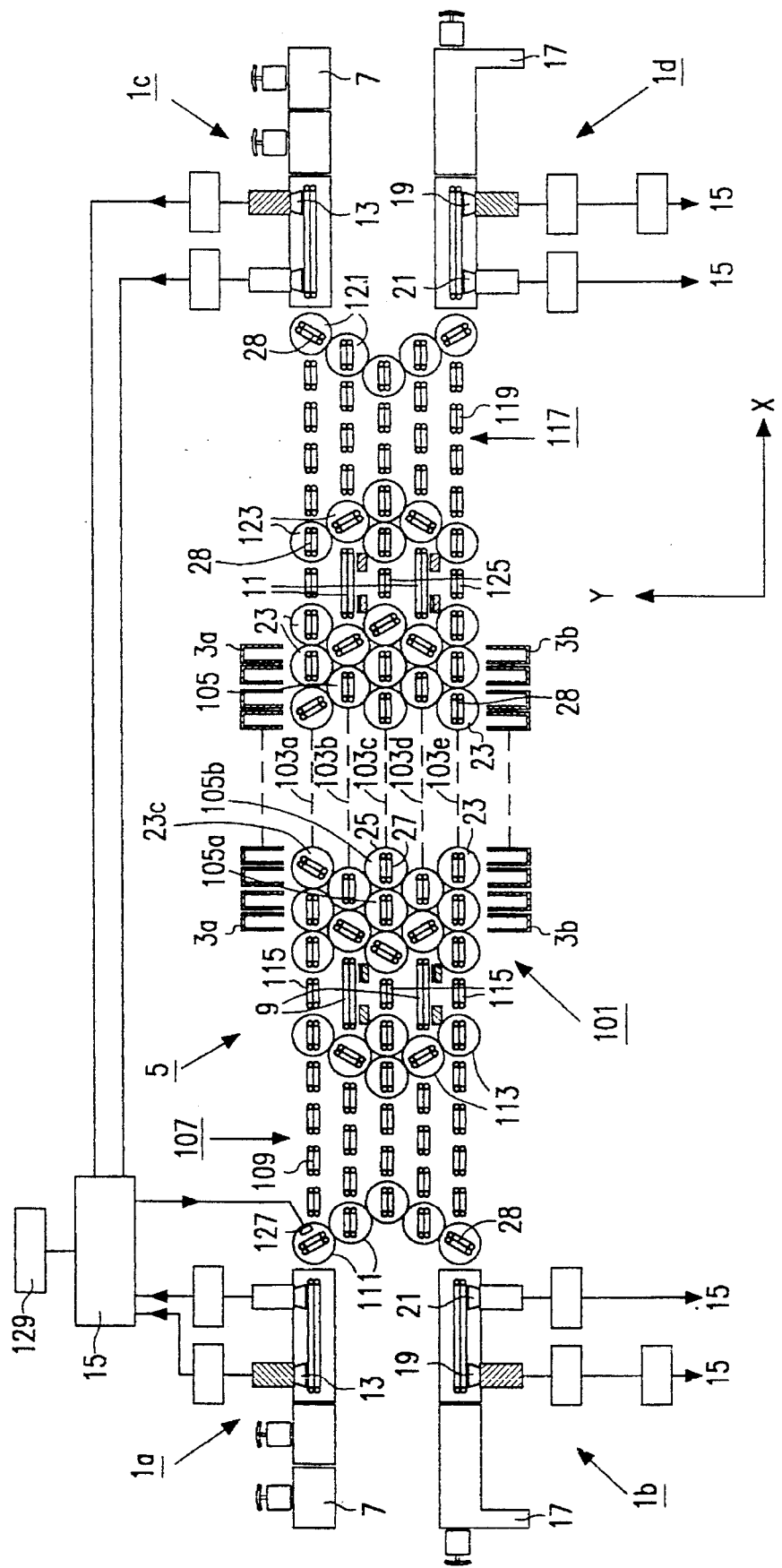
FIG. 1 is a diagrammatic plan view of a sorting device according to the invention.

The sorting device according to the invention shown in FIGS. 1 to 5 is suitable for sorting postal items such as, for example, letters and parcels. The postal items are selectively distributed by the sorting device from four input stations 1a, 1b, 1c and 1d over a large number of output positions 3a, 3b by means of a transport device 5. The sorting device shown in FIG. 1 comprises two rows of one hundred output positions 3a, 3b each.

The input stations 1a and 1c each comprise a manual feed station 7 where postal items provided with address codes are put in by hand by an operator. The address code is a so-called bar code which corresponds to a postal code written by the sender on the postal item, and which is provided by means of a separate manual coding station which is not shown in FIG. 1. As will become evident below, the address code may alternatively be provided in a preceding sorting step by means of an automatic address code writer 9, 11 of the sorting device which is known per se. Furthermore, the input stations 1a and 1c each comprise an automatic address code reader 13 which is known per se and by which the address code is read. The address code reader 13 is connected to an electronic control unit 15 of the sorting device, shown diagrammatically only in FIG. 1, which controls the transport device 5 in a manner to be described in more detail below.

The input stations 1b and 1d each comprise an automatic feed station 17 by means of which postal items having dimensions which lie within fixed limits are automatically introduced into the sorting device. The postal items to be introduced through the input stations 1b and 1d have already been or are yet to be provided with address codes. The input stations 1b and 1d further comprise an automatic address code reader 19 which is identical to the address code reader 13 of the input stations 1a and 1c, and an automatic character reader 21 which is known per se and by means of which printed and hand-written postal codes can be read on postal items not yet coded. The address code reader 19 and the character reader 21 are connected to the control unit 15, as is the address code reader 13.

As is shown in FIG. 1, the transport device 5 is provided with separate transport units 23 which each comprise a disc-shaped support 25 and a transport mechanism 27 which is depicted only diagrammatically in FIG. 1 and is positioned on the disc-shaped support 25. The supports 25 extend in a common horizontal plane which is parallel to a system of coordinates X, Y which is in a fixed position relative to the common plane, and are each rotatable in the common plane about an axis of rotation 28 which is perpendicular to the common plane.

Figure 2:
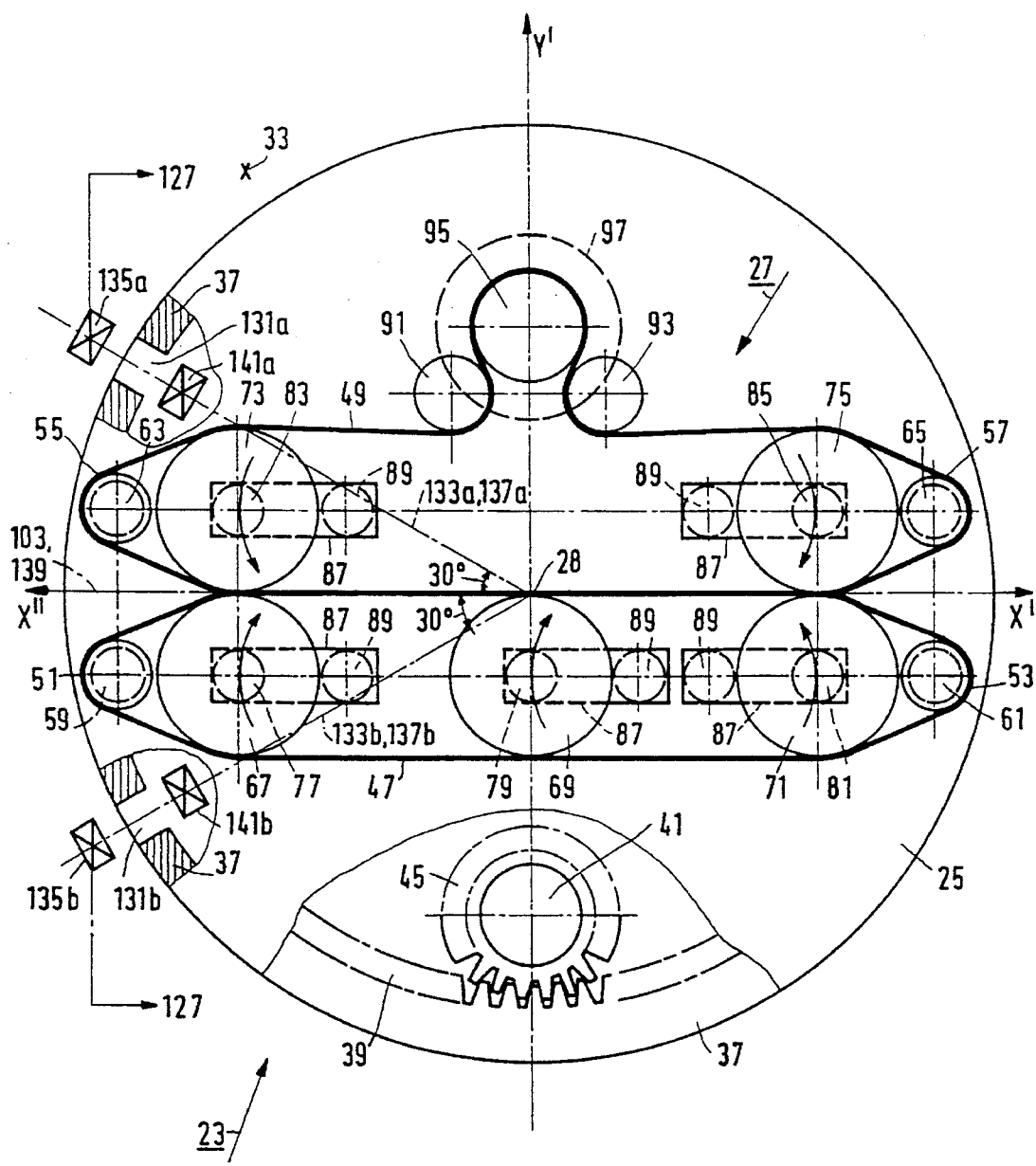
FIG. 2 is a plan view of a transport unit of the sorting device shown in FIG. 1.
Figure 3:
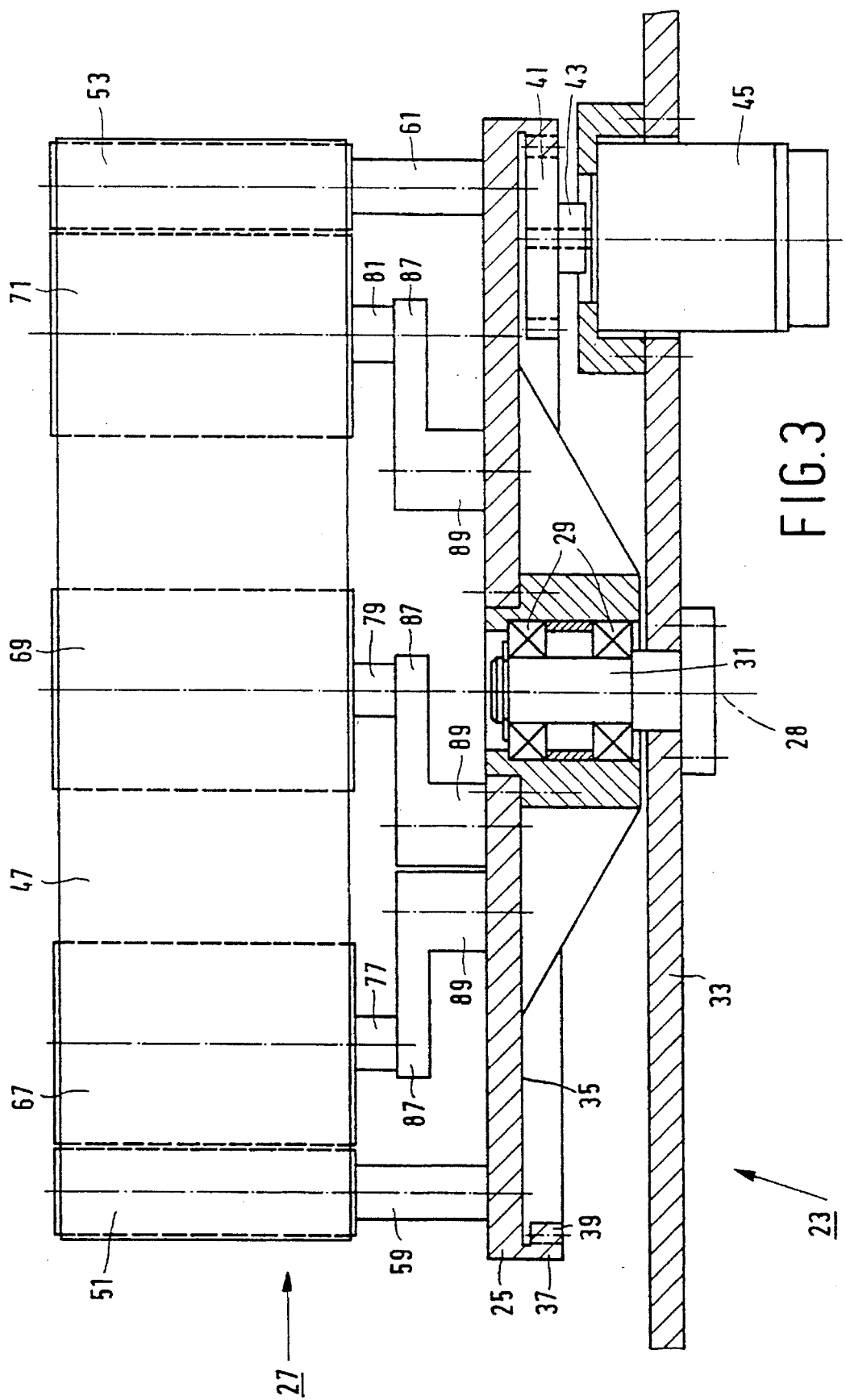
FIG. 3 is a side elevation of the transport unit of FIG. 2.

A transport unit 23 is shown in detail in FIGS. 2 and 3. As is shown in FIG. 3, the support 25 has its rotation possibility by means of ball bearings 29 around a bearing pin 31 which is fastened to a frame plate 33 of the sorting device extending parallel to the common plane of the supports 25. At a lower side 35 of the support 25 there is a circumferential collar 37 which is provided on an inside with a toothed rim 39. As is visible in FIGS. 2 and 3, the toothed rim 39 is in engagement with a pinion 41 which is fastened to an output shaft 43 of an electric drive motor 45 which is fastened to the frame plate 33 and by which the support 25 can be made to rotate.

As is shown in FIG. 2, the transport mechanism 27 of the transport unit 23 arranged on the support 25 is provided with two elastic, substantially parallel and mutually partly tangent endless conveyor belts 47 and 49 which define a transport direction X" parallel to the conveyor belts 47 and 49 in relation to a system of coordinates X', Y' which is in a fixed position relative to the support 25. The conveyor belts 47 and 49 are each guided around two outer rollers 51, 53 and 55, 57 with axes of rotation which are perpendicular to the support 25, which rollers have a comparatively small diameter and each have their rotation bearings around a fixed bearing pin 59, 61 and 63, 65 fastened to the support 25. The conveyor belt 47 is also guided along three further rollers 67, 69 and 71 which also have axes of rotation perpendicular to the support 25 and are arranged between the outer rollers 51 and 53, while the conveyor belt 49 is also guided along two further rollers 73 and 75 with axes of rotation perpendicular to the support 25 and arranged between the outer rollers 55 and 57. The rollers 67, 69, 71 and 73, 75 have a comparatively large diameter compared with the outer rollers 51, 53 and 55, 57 and have their rotation bearings about bearing pins 77, 79, 81 and 83, 85, as is visible in FIGS. 2 and 3. Each bearing pin 77, 79, 81, 83 and 85 is fastened on a separate lateral arm 87 which extends substantially parallel to the transport direction X" and which is rotatable about a bearing pin 89 which is positioned between the outer rollers 51, 53 and 55, 57, is fastened to the support 25, and extends parallel to the axes of rotation of the rollers. The bearing pins 77, 79, 81, 83 and 85 can thus swivel relative to the support 25, whereby the further rollers 67, 69, 71, 73 and 75 are displaceable transverse to the transport direction X". Finally, the conveyor belt 49 is guided via rollers 91 and 93 around a drive shaft 95 of an electric drive motor 97 which is diagrammatically depicted in FIG. 2.

Figure 4:
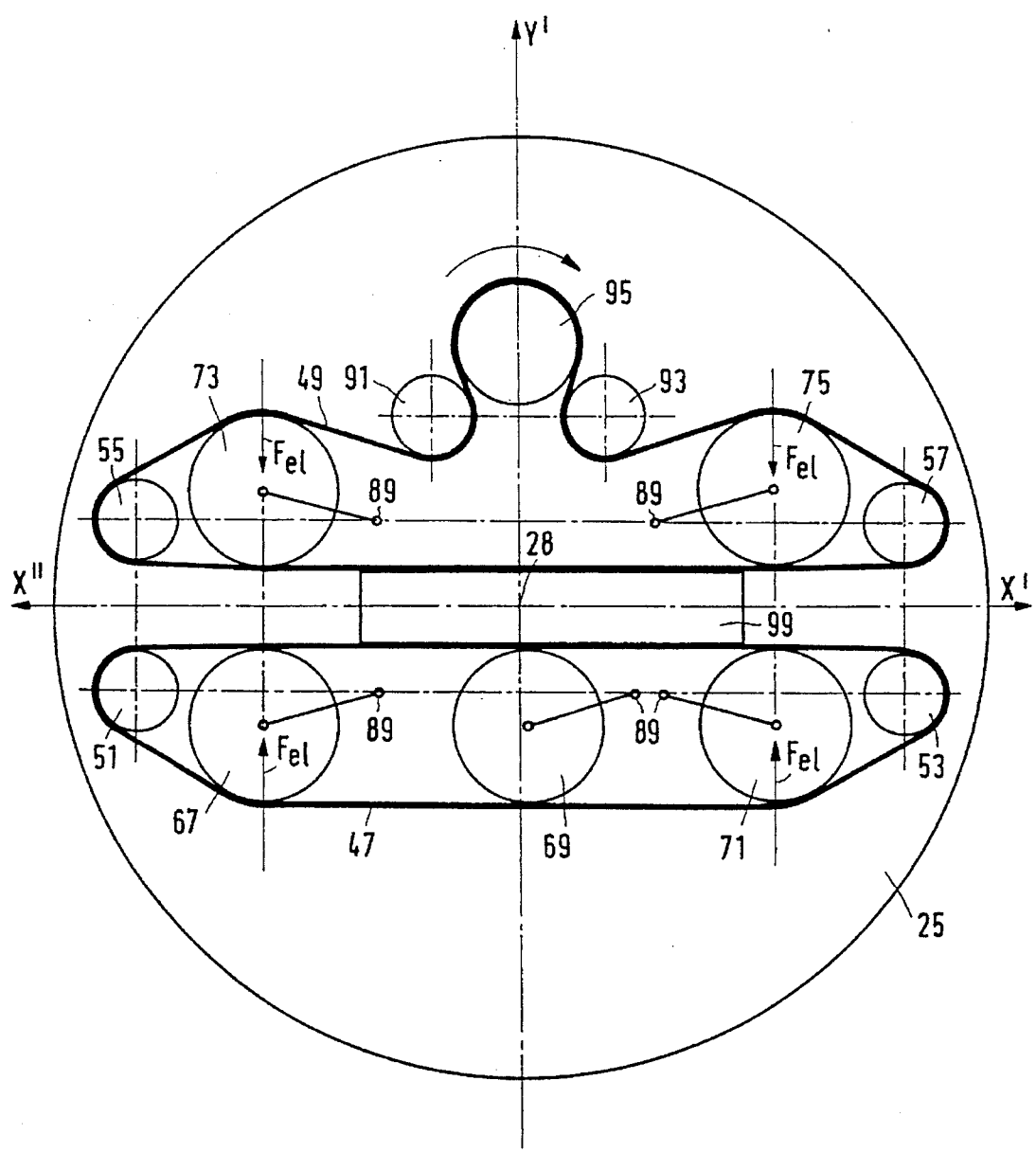
FIG. 4 shows the transport unit of FIG. 2 with a postal item present in the transport unit.

The conveyor belt 49 can be driven by the drive motor 97 through friction with the drive shaft 95, the conveyor belt 47 being taken along through friction between the tangent portions of the conveyor belts 47, 49. FIG. 4 shows a postal item 99 conveyed between the outer rollers 53 and 57. The further rollers 67, 69, 71 and 73, 75 are pressed apart by the postal item 99 in a direction transverse to the transport direction X", whereby an elastic stretching of the conveyor belts 47 and 49 arises. Owing to the elastic stretching, an elastic tension arises in the conveyor belts 47, 49, under the influence of which the further rollers 67, 71, 73 and 75 experience a reset force $F_{e1}$ (see FIG. 4). The postal item 99 is clamped in between the conveyor belts 47 and 49 under the influence of the said reset force $F_{e1}$ and moved in the transport direction X".

As is shown in FIG. 1, a portion of the individual transport units 23 of the transport device 5 is arranged in a hexagonal grid shape in a field 101 which extends parallel to the system of coordinates X, Y which is fixed relative to the field 101. The individual transport units 23 of the field 101 with the transport directions X" which are adjustable relative to the system of coordinates X, Y are arranged in five parallel tracks 103a, 103b, 103c, 103d and 103e, the output positions 3a being positioned alongside the exterior track 103a and the output positions 3b along the exterior track 103e. The output positions are thus readily accessible to an operator of the sorting device. The transport units 23 of the adjoining tracks 103a, 103b, 103c, 103d and 103e are positioned in a staggered arrangement, so that the said hexagonal grid shape is created in the field 101. The inner tracks 103b, 103c and 103d are here provided with central transport units 105 of which the disc-shaped supports 25 are all surrounded in hexagonal arrangement by the disc-shaped supports 25 of six adjoining transport units 23, 105. A through route can be created through mutual orientation of the transport directions X" between two adjoining transport units 23, 105 of the field 101 in that the relevant supports 25 are so rotated that the transport directions X" of the relevant transport units 23, 105 have the same orientation relative to the field 101. In FIG. 1, for example, a through route is provided between the transport units 105a and 105b, whereby a postal item can be moved from transport unit 105a to transport unit 105b or vice versa. In this manner the postal item is movable in one track 103 through mutual orientation of the transport directions X" of the transport units 23, 105 of the relevant track 103, while the postal item is movable from one of two adjoining tracks 103 to the other track 103 through mutual orientation of the transport directions X" of the transport units 23, 105 of these adjoining tracks 103.

As is shown in FIG. 1, the transport device 5 is provided with five parallel buffer lines 107 between the input stations 1a, 1b and the field 101, which buffer lines each comprise a series of non-rotatable transport mechanisms 109 which correspond to the transport mechanisms 27 of the transport units 23. The buffer lines 107 are accessible from the input stations 1a and 1b via five rotatable transport units 111 which are identical to the transport units 23. Between the buffer lines 107 and the field 101, furthermore, there are two automatic address code writers 9 as mentioned above which are accessible from the buffer lines 107 via six rotatable transport units 113. Three separate, non-rotatable transport mechanisms 115 are further arranged parallel to the address code writers 9.

The transport device 5 is provided with five parallel buffer lines 117 in an identical manner between the input stations 1c, 1d and the field 101, each with a series of non-rotatable transport mechanisms 119. The buffer lines 117 are accessible from the input stations 1c and 1d through five rotatable transport units 121. The buffer lines 117 are connectable to two automatic address code writers 11 already mentioned above via six rotatable transport units 123 while three separate transport mechanisms 125 are arranged in parallel with the address code writers 11.

Thus five input positions from which postal items are fed to the field 101 are present at either end of the parallel tracks 103, i.e. the two automatic address code writers 9, 11 and the three separate transport mechanisms 115, 125. The postal items are selectively displaceable from these ten input positions towards the output positions 3a, 3b through mutual orientation of the transport directions X" of the individual transport units 23, 105 in a manner to be described below.

The rotatable transport units 23, 105, 111, 113, 121, 123 and the individual transport mechanisms 109, 115, 119, 125 are each provided with a separate microprocessor 127 which is connected to the said electronic control unit 15, while the microprocessors 127 of adjoining, cooperating transport units or transport mechanisms are mutually connected. FIG. 1 only shows the microprocessor 127 of the transport unit 111 for the sake of simplicity, to which the input station 1a is assigned. The control unit 15 is connected to a programming unit 129 by means of which an operator of the sorting device can put in a sorting program into the control unit 15. A desired sorting mode of the postal items with various address codes over the output positions 3a, 3b is laid down in the sorting program.

A postal item offered at one of the feed locations 7, 17 of the input stations 1 is first moved to the relevant address code reader 13, 19 by which the address code of the postal item is detected and read. The read address code is passed on to the control unit 15 which selects the output position 3a, 3b belonging to the relevant address code (destination) on the basis of the sorting program. Then the postal item is transported to the adjoining transport unit 111, 121, the control unit 15 passing on the destination of the postal item to the microprocessor 127 of the relevant transport unit 111, 121. If the address code of a postal item is not detected in one of the input stations 1b, 1d, the postal item is moved to the automatic character reader 21 of the relevant input station 1b, 1d by means of which the printed or hand-written postal code of the postal item is detected and read and is passed on to the control unit 15. The postal item is subsequently moved to the adjoining transport unit 111, 121, one of the address code writers 9, 11 being passed on to the microprocessor 127 of the relevant transport unit 111, 121 as the provisional destination of the postal item.

The selection of the route to be followed by a postal item between the input station 1 and the selected output position 3 (destination) takes place by means of a search algorithm with which each of the individual microprocessors 127 is programmed. When a postal item has reached a rotatable transport unit 23, 105, 111, 113, 121, 123 or a transport mechanism 109, 115, 119, 125, the microprocessor 127 of the relevant transport unit or transport mechanism decides on the basis of the destination of the postal item passed on to it to which adjoining free transport unit 23, 105, 111, 113, 121, 123 or to which adjoining, free transport mechanism 109, 115, 119, 125 the postal item should be transported according to the search algorithm. Then the postal item is moved to the relevant transport unit 23, 105, 111, 113, 121, 123 or to the relevant transport mechanism 109, 115, 119, 125, the destination of the postal item being passed on to the microprocessor 127 of the relevant transport unit or transport mechanism. Thus postal items having an address code are moved via the transport units 111, 113, 121, 123 and the transport mechanisms 109, 119 to the transport mechanisms 115, 125. Postal items without address code are thus moved to the address code writers 9, 11, where the postal items are yet provided with an address code, which code was passed on to the address code writers 9, 11 by the control unit 15.

Each buffer line 107, 117 comprises a large number, for example fifteen transport mechanisms 109, 119, so that temporary delays in the field 101 or in the address code writers 9, 11 can be accommodated by means of a temporary storage of the postal items in the separate buffer lines 107, 117. It is also possible to deal with a delay which may arise during selecting of the destination of a postal item by the control unit 15. In this case the postal item has one of the transport mechanisms 109, 119 as a provisional destination. The selected destination is passed on by the control unit 15 to the microprocessor 127 of the relevant transport mechanism 109, 119 the moment the postal item has reached the said transport mechanism.

From the input positions of the field 101 formed by the transport mechanism 115, 125 and the address code writers 9, 11, the postal items are moved in a similar manner to the output positions 3a, 3b selected by the sorting program in accordance with the search algorithm and through mutual communication of the microprocessors 127 of the transport units 23, 105. The destination of a postal item to be moved by a transport unit 23, 105 is stored in the microprocessor 127 of the relevant transport unit 23, 105 each time during this, the microprocessor 127 deciding to which adjoining, free transport unit 23, 105 the postal item will be moved in accordance with the search algorithm. The postal item can be moved into the adjoining transport unit 23, 105 after the relevant transport units 23, 105 have been so rotated that their transport directions X" coincide. To render it possible to determine the position of each transport unit 23, 105, the supports 25 are each provided with a first and a second identification mark, as shown in FIG. 2, such as, for example, a first and a second opening 131a and 131b in the collar 37 of the support 25. The openings 131a and 131b are present on two radians 133a and 133b of the axis of rotation 28 of the support 25 which are in a fixed position relative to the support 25 and which enclose an angle of 60° with one another. Two optical detectors 135a and 135b are arranged around the support 25, fastened to the frame plate 33, and connected to the microprocessor 127 of the transport unit 23, 105. The detectors 135a and 135b are present on two radians 137a and 137b of the axis of rotation 28 which are fixed relative to the field 101 and which enclose a positive and a negative angle of 30°, respectively, with a main radian 139 of the axis of rotation 28 which runs parallel to the track 103. A first and a second light source 141a and 141b, also fastened to the frame plate 33, are present on the two radians 137a and 137b. In a preferred position of the transport unit 23, 105 shown in FIG. 2, in which the transport direction X" runs parallel to the track 103, the radians 133a, 133b coincide with the radians 137a, 137b, so that the detectors 135a and 135b receive light from the respective light sources 141a and 141b. In a first subsidiary position of the transport unit 23, 105, in which the transport direction X" encloses a positive angle of 60° with the main radian 139, the radian 133b only coincides with the radian 137a, so that the detector 135a only receives light from the light source 141a. In a second subsidiary position of the transport unit 23, 105, in which the transport direction X" encloses a negative angle of 60° with the main radian 139, the radian 133a only coincides with the radian 137b, so that the detector 135b only receives light from the light source 141b. In this manner, the microprocessor 127 and the detectors 135 are capable of detecting the preferred position of the transport unit 23, 105, in which a postal item is displaceable to an adjoining transport unit 23, 105 in the same track 103, and the subsidiary positions, in which a postal item is displaceable to an adjoining transport unit 23, 105 in one of the adjoining tracks 103. A displacement to the relevant adjoining transport unit takes place when the microprocessor 127 of the relevant transport unit 23, 105 has detected a correct position of the transport unit 23, 105 and when the microprocessor 127 of the adjoining transport unit 23, 105 has passed on a correct position of the adjoining transport unit 23, 105 to the microprocessor 127 of the relevant transport unit 23, 105.

The use of the field 101 of individual transport units 23, 105 arranged in a grid shape provides a system of parallel and crossing routes between the input positions formed by the transport mechanisms 115, 125 and the address code writers 9, 11 and the output positions 3a, 3b of the field 101, wherein alternative through routes can be selected between an input position 9, 11, 115, 125 and a selected output position 3a, 3b through mutual orientation of the transport directions X" of the individual transport units 23, 105. As a result, several postal items can be moved simultaneously and in parallel in the field 101, so that the sorting device has a high capacity. The sorting device is even capable of transporting comparatively heavy postal items which are to be moved through the field 101 at a comparatively low transport speed, with a sufficient capacity because the capacity is determined by the product of transport speed and the number of postal items that can be moved in parallel.

As was noted above, alternative through routes can be selected for the movement of a postal item from an input position to an output position in the field 101 in accordance with the said search algorithm. According to this search algorithm, postal items coming from the input stations 1a and 1b shown in FIG. 1 and having one of the output positions 3a as their destination are transported through the exterior track 103a of the field 101, while postal items coming from the input stations 1a and 1b and having one of the output positions 3b as their destination are transported through the exterior track 103e of the field 101. After a postal item has reached the transport unit 23 situated next to the output position 3a, 3b selected for the postal item, the relevant transport unit 23 is rotated and the postal item is deposited in the relevant output position 3a, 3b. As is visible in FIG. 1, two output positions 3a, 3b are assigned to the transport units 23 of the exterior tracks 103a and 103e each time, so that a postal item is movable by means of the relevant transport unit 23 into the relevant output positions 3a, 3b in two subsidiary positions of the support 25 in which the support 25 is rotated through an angle of 60° and through an angle of 120°, respectively, relative to the preferred position (see the transport unit 23c in FIG. 1). According to the search algorithm, postal items coming from the input stations 1c and 1d shown in FIG. 1 and having one of the output positions 3a as their destination are transported through the track 103b of the field 101, while postal items coming from the input stations 1e and 1d and having one of the output positions 3b as their destination are transported through the track 103d of the field 101. When a postal item in the track 103b, 103d has arrived near the selected output position 3a, 3b, the postal item should be shifted towards the output position 3a, 3b via the corresponding transport unit 23 in the exterior track 103a, 103e. If the transport unit 23 in the relevant exterior track 103a, 103e is temporarily occupied at that moment, a stagnation in the track 103b, 103d can be prevented in that postal items which are next in line in the track 103b, 103d are made to pass the waiting postal item through an adjoining, free transport unit 23 in the track 103c. This selective use of the parallel tracks 103 prevents congestions in the field 101 as much as possible.

Figure 5:
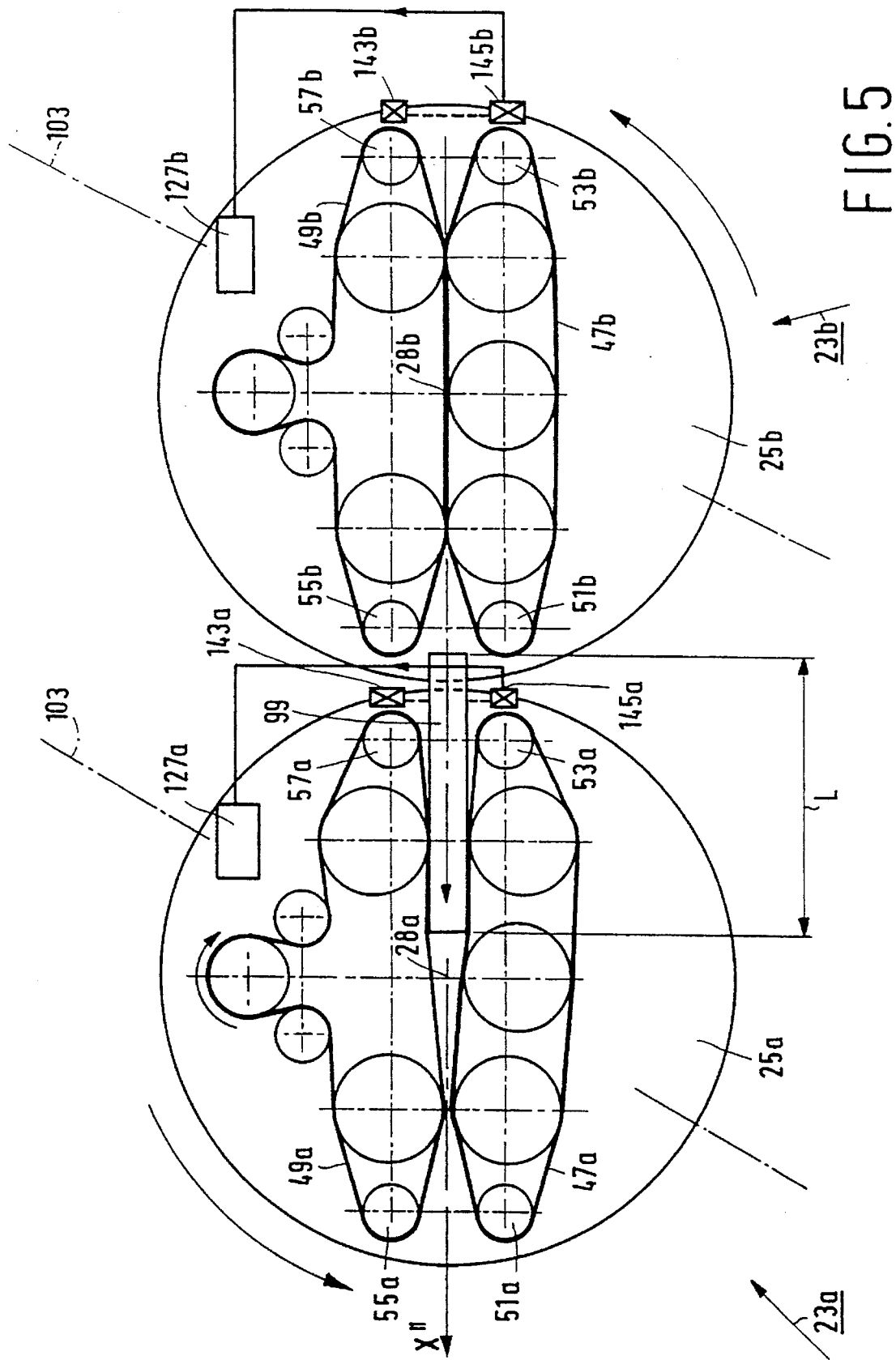
FIG. 5 shows two adjoining transport units of the sorting device of FIG. 1.

The handling capacity of the sorting device shown in FIG. 1 is determined not only by the transport speeds of the individual transport units 23, 105, 111, 113, 121, 123 and transport mechanisms 109, 115, 119 and 125, but also by the time required for a rotation of the supports 25 of the transport units. As is shown in FIG. 5, a necessary rotation of the support 25a of a transport unit 23a can take place already when the postal item 99 is no longer present between the outer rollers 51b, 55b of the adjoining transport unit 23b from which the postal item 99 arrives. The adjoining transport unit 23b can also be rotated again at that moment, for example, into the preferred position directed parallel to the track 103 of the transport unit 23b. To determine the moment when a rotation of the transport units 23a, 23b is allowed, the transport units 23 as well as the transport units 105, 111, 113, 121 and 123 are each provided with a light source 143 and an optical sensor 145 diagrammatically shown in FIG. 5. When a postal item 99 is present between the conveyor belts 47b, 49b of the transport unit 23b, the sensor 145b detects the presence of the postal item 99 and the microprocessor 127b of the transport unit 23b computes the time of passage and subsequently the dimension L of the postal item 99 in a direction parallel to the transport direction X" as the product of the computed time of passage and the transport speed of the conveyor belts 47b, 49b. From the computed dimension L and the transport speed of the conveyor belts 47b, 49b, the microprocessor 127b determines the moment when the postal item 99 will no longer be present between the outer rollers 51b, 55b of the transport unit 23b. The microprocessor 127b also passes on the computed moment to the microprocessor 127a of the adjoining transport unit 23a, so that the transport unit 23a may also be rotated, if necessary. The transport unit 23a is thus rotated already when the postal item 99 is not yet fully present between the conveyor belts 47a, 49a. In this manner the time required for the transport of a postal item through a transport unit 23, 105, 111, 113, 121, 123 is optimally utilized for rotating the relevant transport unit, so that the capacity of the sorting device is reduced to the smallest possible extent by the time required for rotating the transport units 23, 105, 111, 113, 121, 123.

As is evident from the above, each transport unit 23, 105, 111, 113, 121, 123 selects the next transport unit in the route of the postal item through the use of the individual microprocessors 127. The computation time of a microprocessor 127 is independent of the computation time of the other microprocessors 127 in this way, so that the route to be followed by the postal item can be selected quickly and independently of the positions of the other postal items. Owing to the large number of transport units 23, 105, 111, 113, 121, 123, the use of one central microprocessor instead of the individual microprocessors 127 is too inefficient. The computation capacity required for such a central microprocessor is comparatively great compared with the capacity required for the individual microprocessors 127. The number of microprocessors 127 required may be reduced in that a single microprocessor is used for a group of transport units or transport mechanisms which cooperate with one another in accordance with a fixed pattern, such as, for example, the transport mechanisms 109 in one of the buffer lines 107, or the transport units 111.

Figure 6:
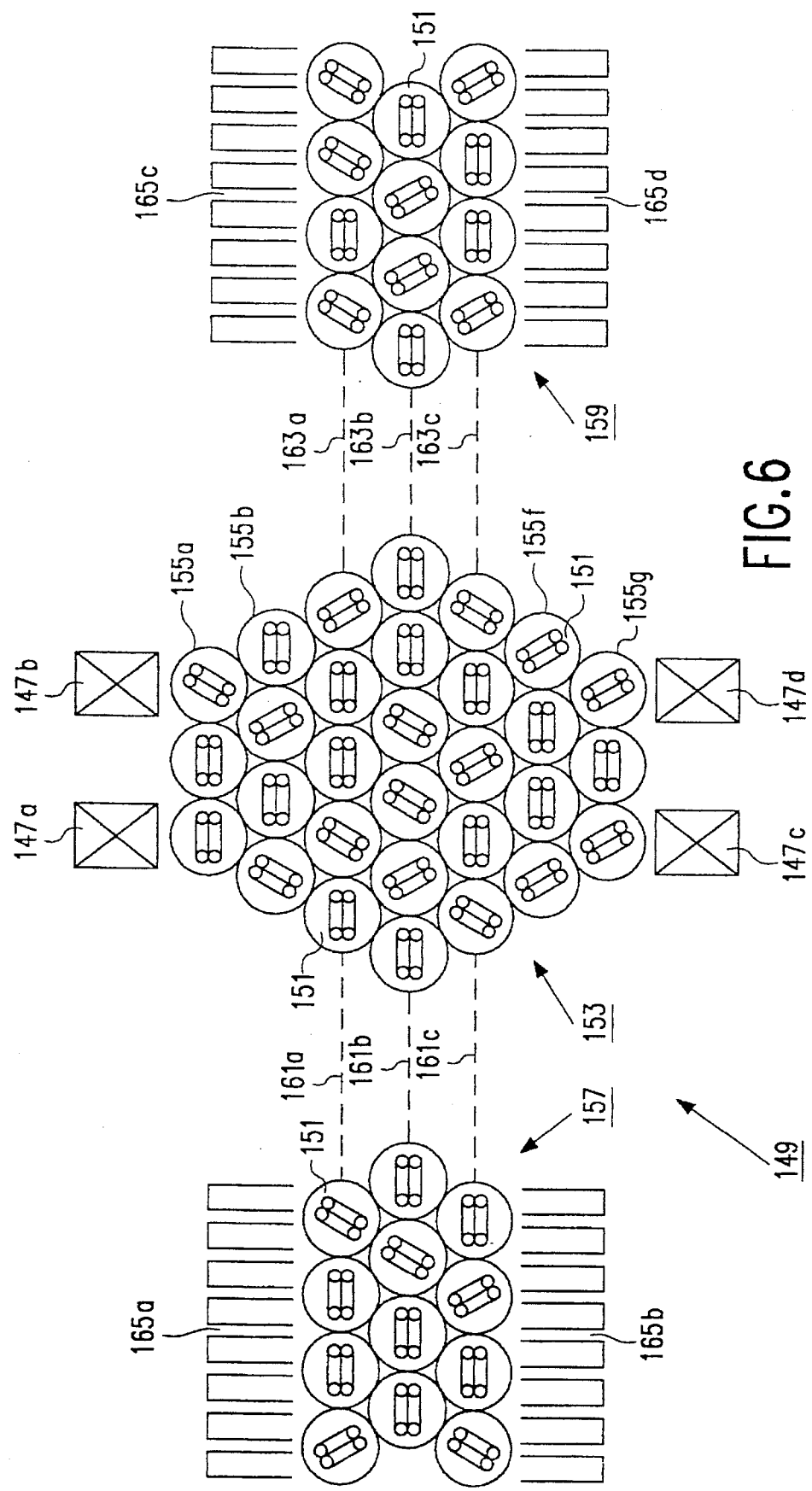
FIG. 6 is a diagrammatic plan view of an alternative embodiment of a sorting device according to the invention.

In the sorting device shown in FIG. 1, a field 101 comprising five parallel tracks 103 of individual transport units 23, 105 is used, two input stations 1 being arranged at either end of the parallel tracks 103, while a row of output positions 3a, 3b is arranged parallel to each of the exterior tracks 103a, 103e. It is noted that the input positions and output positions may be arranged in a different manner relative to the field of individual transport units in the design of the sorting device. Thus FIG. 6 shows, by way of example, an alternative embodiment of a sorting device with input positions 147 which are arranged in the centre of the sorting device. The alternative sorting device comprises a field 149 of individual transport units 151 positioned in a hexagonal grid arrangement. In a central portion 153 of the field 149, the transport units 151 are arranged in seven parallel tracks 155, while the field 149 comprises two wing portions 157, 159 in which the transport units 151 are arranged in three parallel tracks 161, 163. The alternative sorting device comprises four rows of fifty output positions 165a, 165b, 165c and 165d each, which positions are arranged along the respective exterior tracks 161a, 161c, 163a and 163c of the field 149. The sorting device comprises four input positions 147, of which the input positions 147a and 147b are arranged alongside the exterior track 155a of the field 149, while the input positions 147c and 147d are arranged alongside the exterior track 155g of the field 149. The average distance between the input positions 147 and the output positions 165 in the alternative sorting device is comparatively small, so that the postal items are moved in a comparatively short transport time. Furthermore, no routes of opposed directions arise in the alternative sorting device, so that the risk of congestions is very small.

In the sorting devices shown in FIGS. 1 and 6, the individual transport units are arranged in a hexagonal grid shape. An optimum utilization of the available surface area of the field by the supports of the transport units is provided thereby. It is noted that the transport units may alternatively be arranged in a different grid shape such as, for example, a square or rectangular grid shape if an optimum utilization of the available surface area is not necessary or desired, or if a different type of transport unit is used as will be described below.

Figure 7:
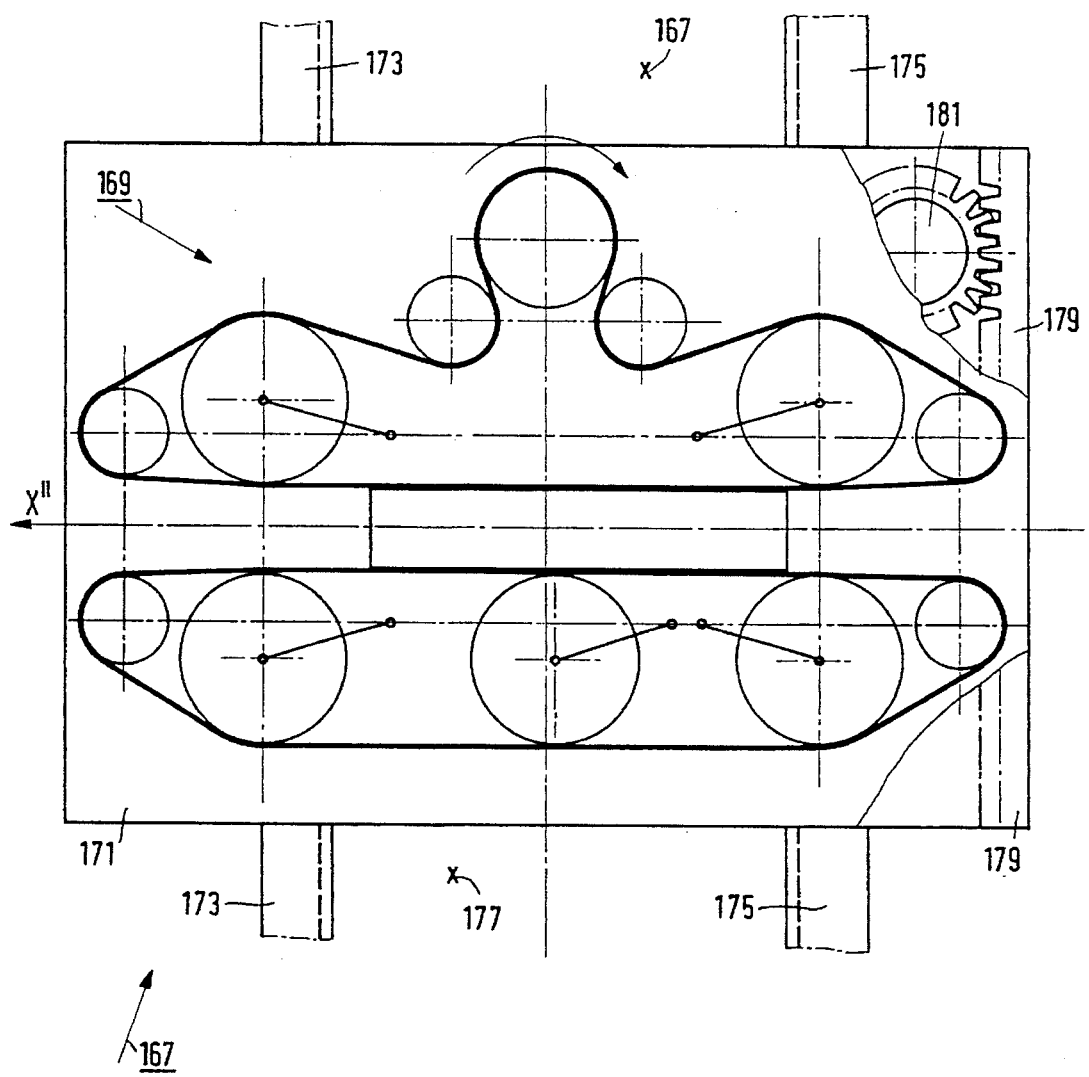
FIG. 7 is a plan view of an alternative transport unit which can be used in the sorting device of FIG. 1.
Figure 8:
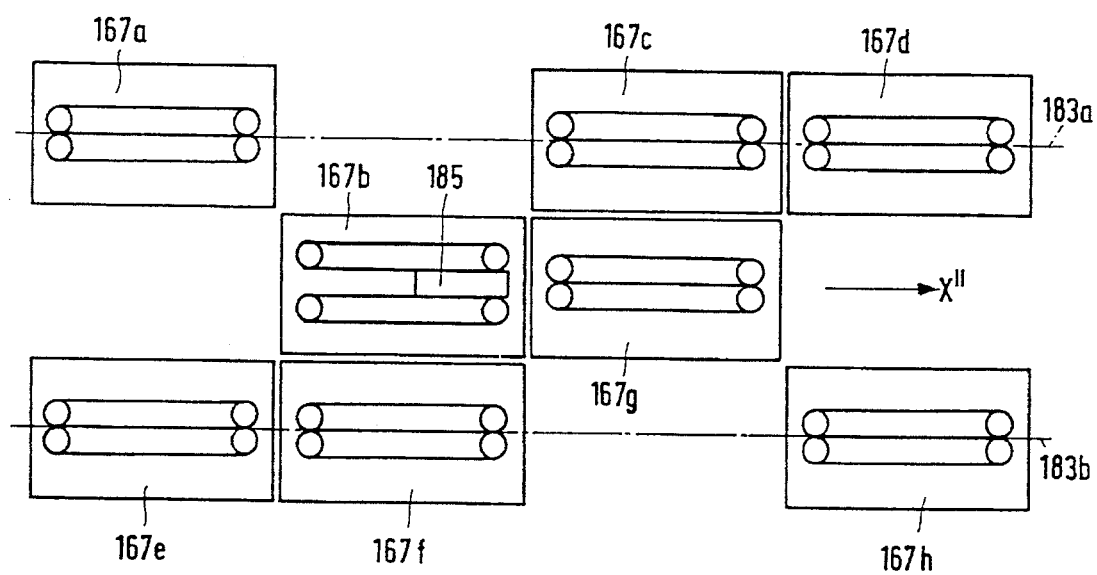
FIG. 8 shows four cooperating alternative transport units according to FIG. 7.

It is further noted that an alternative type of transport unit may be used in the sorting device instead of the transport unit 23 with rotatable support 25 shown in FIGS. 2 and 3, for example, the alternative transport unit 167 shown in FIG. 7. The transport unit 167 is provided with a transport mechanism 169 which is identical to the transport mechanism 27 of the transport unit 23. Instead of the rotatable support 25, the transport unit 167 comprises a carriage 171 which is movably guided along two straight guides 173, 175 of a frame plate 177 of the alternative sorting device, which guides extend perpendicular to the transport direction X" of the transport mechanism 169, by means of guide rollers not visible in FIG. 7. The carriage 171 is for this purpose provided at a lower side with a straight rack 179 which engages a pinion 181 of an electric drive motor of the transport unit 167, which motor is fastened on the frame plate 177 and is not visible in FIG. 7. The transport units 167 are arranged in tracks 183 which run parallel to the transport direction X" in a square or rectangular grid shape. FIG. 8 shows the transport units 167a, 167b, 167c and 167d in track 183a and the transport units 167e, 167f, 167g and 167h in track 183b, transport units 167b and 167g being temporarily joined together by displacements perpendicular to the transport direction X". Thus a postal item 185 can be moved from track 183a to track 183b in the position shown in FIG. 8. The transport units 167 thus also provide a field of parallel and interlocking routes in this manner. The transport units 167a and 167e, 167b and 167f, 167c and 167g, 167d and 167h arranged in a column of the field may alternatively be positioned on a shared transverse carriage in sorting machines in which a plurality of alternative routes is desired and in which no particular requirements are imposed on the transport capacity of the sorting device.

It is finally noted that the use of the sorting device according to the invention is not limited to sorting of postal items. The sorting device is also applicable to sorting of objects of other types, in which case the sorting device is provided with transport units which are suitable for displacing such objects. Thus the sorting device is suitable, for example, for a magazine for the temporary storage of goods having different type numbers, where a different output position is selected for each type number, or for sorting of products on the basis of a characteristic feature such as, for example, size or weight.

I claim:

1. A sorting device comprising at least one input position, a plurality of output positions, and a transport device for displacing an object from any of the input positions to any selected one of the output positions; characterized in that the transport device comprises:

a field of individual transport units arranged in parallel tracks linking each of the input positions with each of the output positions, their being at least two transport units in each track;

each transport unit having a transport direction which is adjustable relative to a system of coordinates which is fixed with respect to said field; and control means by which alternative routes through said field are selectable between an input position and a selected output position by controlling the mutual orientations of the transport directions of the individual transport units along said routes;

an object being displaceable along a track through mutual orientation of the transport directions of the transport units on said track, and being displaceable from one to the other of two adjoining tracks through mutual orientation of the transport directions of the transport units in both of said two tracks.

2. A sorting device as claimed in claim 1, characterized in that at least two input positions are present at each of the two ends of the parallel tracks.

3. A sorting device as claimed in claim 1, characterized in that the output positions are arranged along the outermost of the parallel tracks.

4. A sorting device as claimed in claim 1, characterized in that each of the transport units comprises a transport mechanism arranged on a support, which mechanism determines the transport direction of the transport unit relative to said system of coordinates; the supports of the individual transport units extending in a common plane which is parallel to said system of coordinates; each support being rotatable about an axis of rotation which extends perpendicular to the common plane, a particular mutual orientation of the transport directions of two adjoining transport units being achieved by said control means producing suitable rotation of the relevant supports about their axes of rotation.

5. A sorting device as claimed in claim 4, characterized in that the supports are disc-shaped and the field of transport units has a hexagonal grid shape, while the support of at least one central transport unit is hexagonally surrounded by the supports of six adjoining transport units.

6. A sorting device as claimed in claim 5, characterized in that the support of a transport unit has a preferred position in which the transport direction of the transport unit runs parallel to a track of the field, while the support has two subsidiary positions in which the support is rotated through a positive angle of 60° and through a negative angle of 60°, respectively, relative to the preferred position.

7. A sorting device as claimed in claim 6, characterized in that the support is provided near a circumference with a first and a second identification mark, which marks are present on two radians of the axis of rotation of the support which enclose an angle of 60° with one another, while a first and a second detector are arranged around the support on two radians of the axis of rotation of the support which enclose a positive and a negative angle of 30°, respectively, with a main radial of the axis of rotation directed parallel to the track, which detectors are in a fixed position relative to the field, the first and the second identification mark being simultaneously detectable by the first and the second detector, respectively, in the preferred position of the support, while exclusively the second identification mark is detectable by the first detector in one of the two subsidiary positions of the support, and exclusively the first identification mark is detectable by the second detector in the other subsidiary position of the support.

8. A sorting device as claimed in claim 6, characterized in that two output positions are assigned to a transport unit arranged in an exterior track of the field, an object being displaceable to the output positions by means of the transport unit in two subsidiary positions of the support in which the support is rotated through an angle of 60° and through an angle of 120°, respectively, relative to the preferred position.

9. A sorting device as claimed in claim 4, characterized in that the transport mechanism is provided with two conveyor belts arranged parallel to the transport direction of the transport unit, each belt being guided around two rollers which are displaceable transverse to the transport direction against a reset force and which have axes of rotation extending perpendicular to the support, whereby the object is displaceable in the transport direction by means of a clamping action between the two conveyor belts caused by the reset force.

10. A sorting device as claimed in claim 9, characterized in that the conveyor belts are elastic, the reset force arising through elastic deformation of the conveyor belts upon a displacement of the rollers.

11. A sorting device as claimed in claim 10, characterized in that the conveyor belts are each guided around two outer rollers which are arranged in a fixed position relative to the support and which have a comparatively small diameter and an axis of rotation directed perpendicular to the support, while the displaceable rollers have a comparatively great diameter and are arranged between the outer rollers, the displaceable rollers being pivotable about a pivot axis directed parallel to the axis of rotation of the outer rollers.

12. A sorting device as claimed in claim 9, characterized in that the transport units each comprise a sensor for measuring a dimension of the object to be displaced parallel to the transport direction.

13. A sorting device as claimed in claim 1, characterized in that the transport units each have a separate microprocessor which is connected to the microprocessors of the adjoining transport units which cooperate with the relevant transport unit, the object being displaceable by the transport unit to an adjoining transport unit to be determined by the microprocessor in accordance with a shared search algorithm, while the microprocessor upon a displacement of the object to the adjoining transport unit passes on a desired output position for the object to the microprocessor of the adjoining transport unit.

* * * * *